United States Patent [19]

Betts, Sr.

[11] Patent Number: 5,163,567

[45] Date of Patent: Nov. 17, 1992

[54] DRAINING LABORATORY DRYING RACK SYSTEM

[76] Inventor: Paul J. Betts, Sr., 15487 Linn Ct., Spring Lake, Mich. 49456

[21] Appl. No.: 879,885

[22] Filed: May 7, 1992

[51] Int. Cl.$^5$ ............................................. A47F 5/00
[52] U.S. Cl. .................................. 211/75; 211/59.1; 248/222.4
[58] Field of Search ............... 211/75, 87, 88, 59.1, 211/41; 248/220.3, 220.4, 221.1, 222.4

[56] References Cited

U.S. PATENT DOCUMENTS

| | | |
|---|---|---|
| 507,233 | 10/1893 | Marshall . |
| 776,332 | 11/1904 | Kloeppinger . |
| 843,826 | 2/1907 | Kloeppinger . |
| 1,863,471 | 6/1932 | Colaizzi . |
| 3,028,973 | 4/1962 | Padgett ................................ 211/87 |
| 3,779,392 | 12/1973 | Betts, Sr. . |
| 3,912,212 | 10/1975 | Betts, Sr. . |
| 4,485,929 | 12/1984 | Betts, Sr. . |
| 4,756,582 | 7/1988 | Heien ................................ 211/41 X |
| 4,932,538 | 6/1990 | Gambello ................................ 211/87 |
| 5,012,934 | 5/1991 | Newhall ................................ 211/41 |
| 5,109,990 | 5/1992 | Murphy et al. ...................... 211/41 |

Primary Examiner—Robert W. Gibson, Jr.
Attorney, Agent, or Firm—Varnum, Riddering, Schmidt & Howlett

[57] ABSTRACT

A draining laboratory drying rack system comprises a panel having a plurality of apertures formed therein, a plurality of pegs mounted in the apertures for supporting wet laboratory equipment, a catch drain mounted to the rear of the panel to collect water dripping down the rear of the panel and a drip trough to collect water from the catch drain, water dripping down the front of the panel and water dripping directly from the supported laboratory equipment. The incorporation of the catch drain on the rear surface of the panel provides effective means to collect, and properly dispose of liquid which can find its way to the rear surface of the panel.

24 Claims, 2 Drawing Sheets

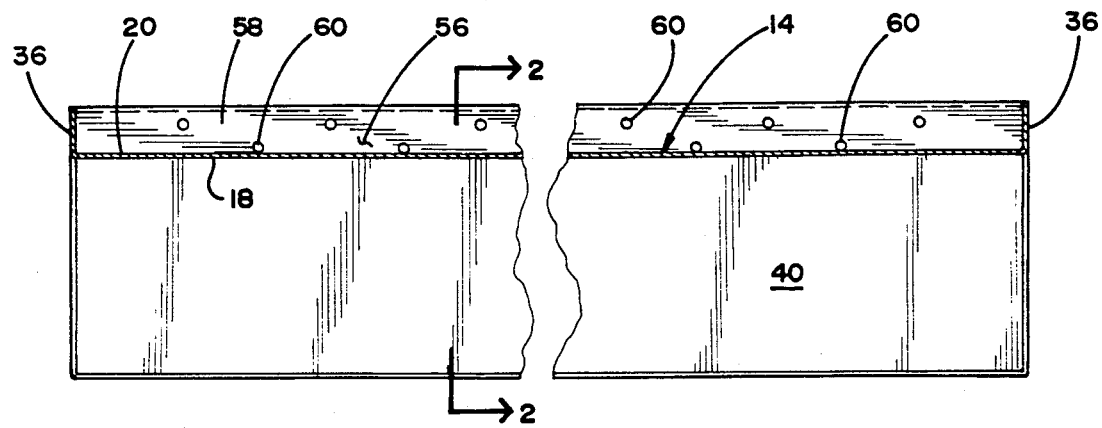
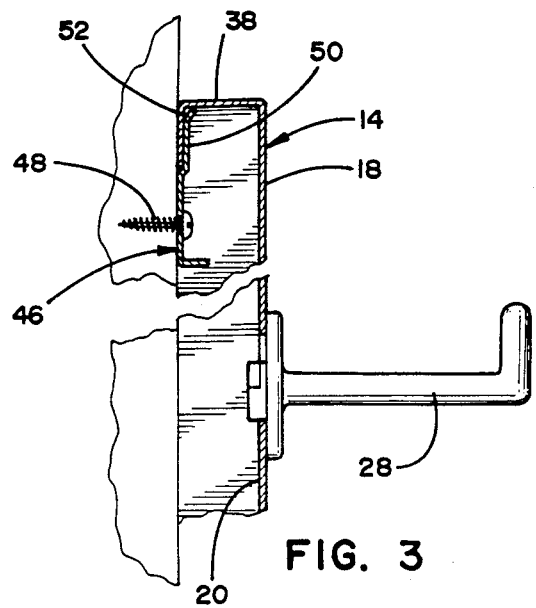
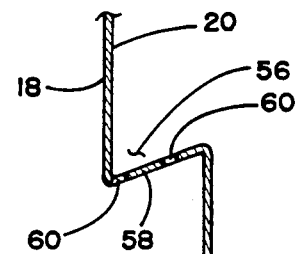
FIG. 4
FIG. 3
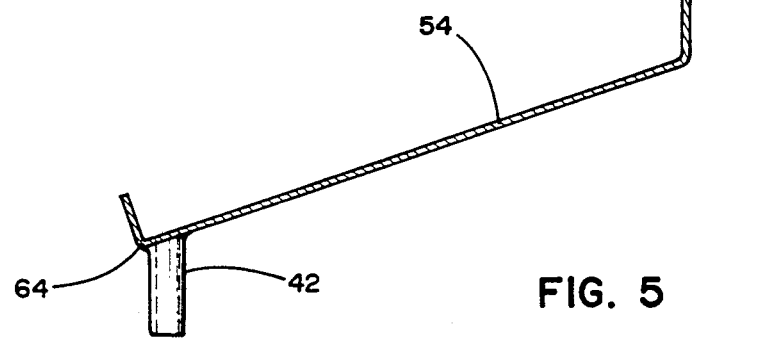
FIG. 5

DRAINING LABORATORY DRYING RACK SYSTEM

BACKGROUND OF THE INVENTION

1. Field of the Invention

The invention relates to a draining laboratory drying rack system which provides a versatile apparatus used for holding wet laboratory equipment and draining the moisture therefrom.

2. Description of Related Art

In chemical laboratories, medical testing centers and other facilities wherein glassware and other laboratory equipment is frequently used, drain boards or racks are utilized for holding the wet glassware and equipment to air dry after washing. Conventional drain boards have been made of soapstone which is impervious to chemicals. The soapstone drain boards include apertures drilled therethrough for mounting wooden or plastic pegs with adhesive.

An alternative to the conventional soapstone drain board is disclosed in U.S. Pat. No. 3,779,392, issued Dec. 18, 1973 to Betts, Sr., U.S. Pat. No. 3,912,212, issued Oct. 14, 1975 to Betts, Sr., and U.S. Pat. No. 4,485,929, issued Dec. 4, 1984 to Betts, Sr. Each of the Betts, Sr. patents disclose a lightweight laboratory drain board formed from sheet material with pegs extending from the board to support laboratory equipment thereon. The laboratory drain boards or panels can be wall mounted or freestanding. Pegs are selectively received in apertures of the board. In the Betts, Sr. '392 patent the pegs are secured to the board by slip nuts. The pegs of the Betts, Sr. '212 and Betts, Sr. '929 patents are provided with an enlarged head having a smaller neck portion which is inserted through the aperture and subsequently slide downward into place to thereby lock the peg onto the drain board. In the Betts, Sr. '212 patent, T-shaped pegs are used in T-shaped apertures and in Betts, Sr. '929 patent, triangular-shaped pegs are mounted in triangular-shaped apertures.

Laboratory draining rack systems such as those disclosed in the various Betts, Sr. patents discussed above are widely used in medical testing and research facilities. Several of these facilities are conducting research and tests on highly contagious and deadly viruses, such as the HIV virus which is the cause of Acquired Immune Disease Syndrome (AIDS). Not surprisingly, the laboratory workers which are exposed to such viruses on a daily basis are extremely cautious in cleaning the laboratory and laboratory equipment. For example, when cleaning a laboratory draining rack such as the Betts, Sr. drying racks described above, the draining rack is typically subjected to a spray of a sterilizing solution such as bleach.

A concern expressed by laboratory workers with the known drying rack systems having apertures formed in the drying rack is that liquid carrying the virus may pass through the apertures to the rear surface of the panel and collect on the back surface, free from the sterilizing spray to the front surface of the panel. The known drying rack systems make no provisions for the elimination of liquid or moisture which can collect on the rear surface of the drying rack.

SUMMARY OF INVENTION

The draining laboratory drying rack system according to the invention overcomes the problems of the prior art systems by incorporating a catch drain on the rear surface of the drying rack to collect and remove any liquid which can collect on or seep onto the rear surface of the laboratory drying rack.

The drying rack system according to the invention is used for supporting a variety of pieces of laboratory equipment. The drying rack system comprises a panel having a front surface and a rear surface, at least one panel aperture extending through the panel and at least one peg mounted in the aperture for supporting laboratory equipment. A catch drain is mounted to the rear surface of the panel below the at least one aperture. The catch drain collects liquid draining down or collecting on the rear surface of the panel. Preferably, the drainage rack is formed of sheet material and is mounted to a wall.

The catch drain preferably comprises a flange extending upwardly and to the rear of the panel at an acute angle from the rear surface of the panel. A catch drain aperture can be formed in the catch drain for removing liquid therefrom. In another embodiment, the catch drain aperture comprises at least one row of apertures extending through the catch drain immediately adjacent the junction between the catch and the rear surface of the panel. A second row of catch drain apertures extending through the catch drain a spaced distance from the first row of apertures can also be formed in the catch drain.

A drip trough is preferably mounted at the bottom edge of the panel below the catch drain to receive liquid from the catch drain aperture. A drain tube is mounted to the drip trough to channel the liquid from the drip trough. In another embodiment, the drip trough extends downwardly at an obtuse angle from the front surface of the panel.

In embodiment, the panel aperture is noncircular in cross section and the cross section of the peg is complementary such that the peg is selectively mounted in the aperture. In one embodiment, the peg is substantially normal to the front surface of the panel. In another embodiment, the peg extends upwardly at an acute angle from the front surface of the panel.

BRIEF DESCRIPTION OF THE DRAWINGS

The invention will now be described with reference to the drawings wherein:

FIG. 3 is a partial sectional view of the wall mounting bracket taken along lines 3—3 of FIG. 1;

FIG. 4 is a sectional view of the catch drain taken along 4—4 of FIG. 1; and

FIG. 5 is a partial sectional view of an alternative embodiment of the drain trough as seen in FIG. 2.

DESCRIPTION OF THE PREFERRED EMBODIMENT

Figure 1:
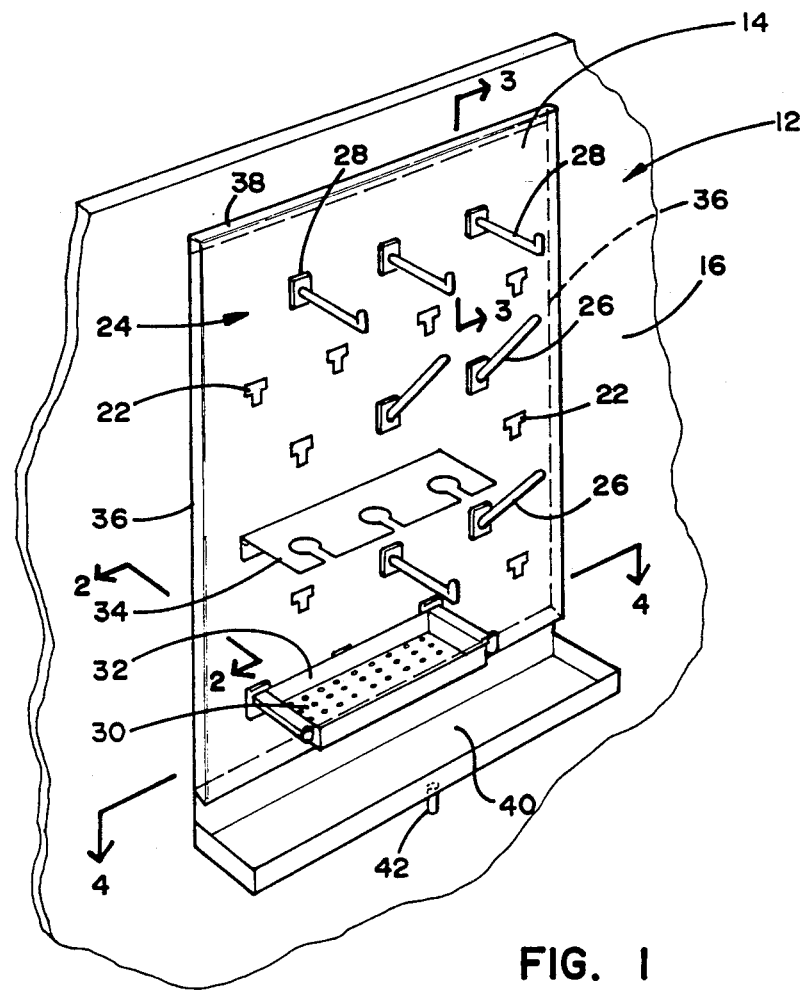
FIG. 1 is a left-perspective view of the draining laboratory drying rack system according to the invention.
Figure 2:
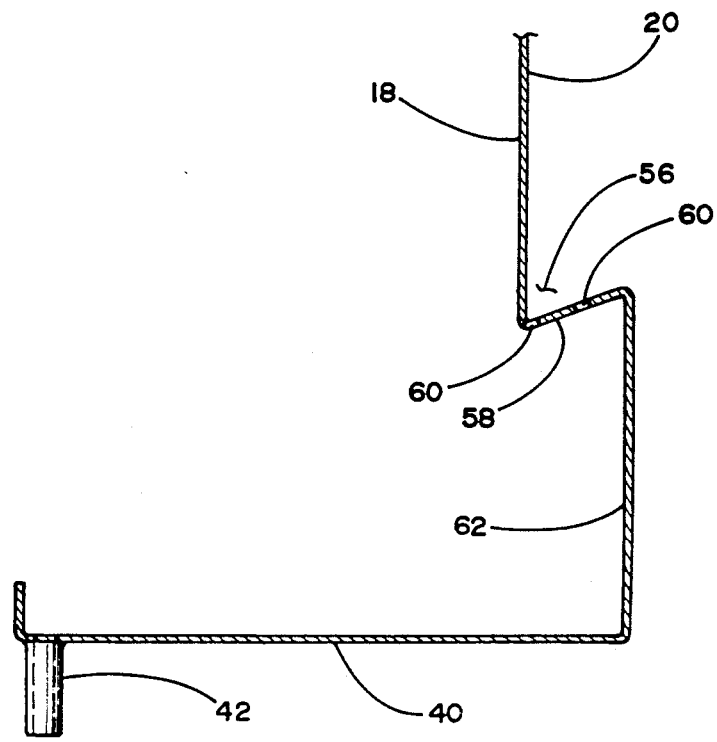
FIG. 2 is a partial sectional view of the drainage trough taken along lines 2—2 of FIG. 1.

Referring now to the drawings and to FIG. 1 in particular, a laboratory drying rack system 12 includes a panel 14 adapted to be mounted to a wall 16. The panel 14 has a front surface 18 (FIG. 2) and a rear surface 20 (FIG. 2). At least one panel aperture 22 is formed in the panel 14. The panel 14 includes a plurality of pegs 24 including slanted pegs 26 and support pegs 28 which are releasably secured to the panel aperture 22. The pegs 24 are easily removable and replaceable to permit cleaning of the pegs 24 and the panel 14.

The pegs 24 can be mounted to the panel 14 in one of several different manners. Examples of suitable mounting structures are seen in U.S. Pat. No. 3,779,392, issued Dec. 18, 1973 to Betts, Sr., U.S. Pat. No. 3,912,212, issued Oct. 14, 1975 to Betts, Sr., and U.S. Pat. No. 4,485,929 issued Dec. 4, 1984 to Betts, Sr. Each of these prior Betts, Sr. patents are expressly incorporated herein by reference.

The slanted pegs 26 typically hold tubes, bottles or other laboratory equipment thereon. The support pegs 28 are generally normal to the front surface 18 of the panel 14 and are adapted to mount a variety of utensil support articles which serve to hold various types of laboratory equipment, including funnels, pipettes, mixing bowls, slides, bottle stoppers, tubing, etc. The support pegs 28 enable the system 12 to be equipped with a variety of utensil support articles. Specifically, a drain basket 30 and drain shelf 32 provides means for holding larger, irregular-shaped equipment, allowing the equipment to air dry and a funnel rack 34 serves as a means to hold a funnel in an upright position for air drying.

A drip trough 40 is preferably mounted along the bottom edge of the panel 14 and extends outwardly from the front surface 18 a short distance to collect liquid which can drip from the various pieces of laboratory equipment supported on the pegs 24 or utensil support articles or which can drip down the front surface 18 of the panel 14. Preferably, the drip trough 40 has a drain tube 42 connected to the lowest point of the drip trough 40 to channel any liquid in the trough 40 to a suitable disposal means such as a sink. The liquid will naturally flow to the lowest point of the trough 40 by the force of gravity.

As best seen in FIG. 1, the panel 14 is provided with side walls 36 and a rearwardly-extending top wall 38. The side walls 36 of the panel 14 are formed by bending the sides of the panel 14 at a 90° angle relative to the front surface 18 thereof. The top wall 38 is formed by bending the top of the panel 14 into an L-shaped configuration having a rearwardly-extending flange 38 and a downwardly extending mounting flange 52 (FIG. 3).

The laboratory drying rack system 12 is preferably mounted to the wall above or adjacent to the sink in which the laboratory equipment is being washed. As seen in FIG. 3, a wall mounting bracket is securely fastened to the wall 16 by a plurality of fasteners 48. The wall mounting bracket 46 has an upwardly extending offset flange 50 which is spaced from the wall 16 a short distance. The panel 14 is mounted in place against the wall 16 by inserting the downwardly extending mounting flange 52 of the panel 14 into the space between the offset flange 50 of the mounting bracket 46 and the wall 14. The mounting bracket 46 can extend the width of the panel 14 or alternatively, two or more shorter brackets can be employed. Thus, the mounting bracket 46 allows for easy removal and replacement of the panel 14 for cleaning.

If it is not desired to mount the panel 14 to the wall, a portable drying rack can alternatively be provided as described in U.S. Pat. No. 4,485,929 issued Dec. 4, 1984 to Betts, Sr.

If all of the apertures 22 of the panel 14 are not provided with a peg 24, liquid may seep through the open panel apertures 22 to the rear surface of the panel 20. Alternatively, if a peg 24 is not correctly mounted in the aperture 22, liquid can seep to the rear surface 20 of the panel 14. In order to ensure a sterile environment in and around the laboratory drying rack system 12, the system must be provided with some means to collect and channel away any and all liquid which collects or drains on the rear surface 20 of the panel 14.

The laboratory drying rack system 12 according to the invention incorporates a catch drain 56 on the rear surface 20 of the panel 14 to collect any liquid which can collect or flow down the rear surface 20 of the panel and preferably channel the liquid into the drip trough 40 for proper disposal. As best seen in FIG. 2, the catch drain 56 comprises an upwardly directed flange 58 extending toward the wall 16. The flange 58 preferably creates an acute angle with the rear surface 20 of the panel 14.

As seen in FIGS. 2 and 4, a plurality of catch drain apertures 60 are formed in the flange 58 and the catch drain 56 spans the entire width of the panel 14. Any liquid which drains down the rear surface 20 of the panel 14 is initially collected in the catch drain 56 and then passes through the catch drain apertures 60 into the drip trough 40. In the preferred embodiment, a first row of catch drain apertures are mounted immediately adjacent the junction between the flange 58 and the bottom edge of the panel 14 and a second row of apertures 60 are formed a spaced distance from the first row.

Although the catch drain 56 of the preferred embodiment is mounted along the bottom edge of the panel 14, more than one catch drain 56 could be mounted at any point along the rear surface 20 of the panel, provided that at least one catch drain 56 was below the lowest panel aperture 22 so that any and all liquid passing through an aperture would be collected by one catch drain and properly disposed of. In addition, the catch drain 56 of the preferred embodiment incorporates a plurality of apertures 60 to permit the liquid to flow to the drip trough 40. Alternatively, a single aperture could be incorporated to channel the liquid to a sink or other suitable disposal means. However, any suitable means for collecting and ultimately removing the liquid from the catch drain is acceptable.

As seen in FIG. 2, the drip trough 40 is mounted immediately below the catch drain 56. The drip trough 40 is preferably supported by the catch drain 56 and a vertical support member 62. Similar to the formation of the side wall and top wall 38 of the panel, the catch drain 56, vertical support member 62 and drip trough 40 are preferably formed by manipulating a single piece of sheet material, such as stainless steel, into the desired shape.

FIG. 5 shows an alternative embodiment of the drip trough 54. In this alternative embodiment, the drip trough 54 extends downwardly, thereby creating an obtuse angle between the drip trough 40 and the front surface 18 of the panel 14. By angling the drip trough 40 downward, any liquid falling into the trough 40 can be easily collected at the lowermost corner 64 and removed for proper disposal.

Medical workers and laboratory technicians are exposed daily to extremely hazardous and life threatening viruses. Therefore, it is imperative that all laboratory equipment used in testing and research be thoroughly cleaned and sterilized. It is also extremely important that a laboratory drying rack system is capable of being cleaned and sterilized easily to eliminate and minimize laboratory and medical worker's exposure to the hazardous viruses. The laboratory drying rack system according to the invention provides a safe, clean and efficient way to support laboratory equipment, and more importantly, to clean and sterilize the drying rack system itself. The laboratory drying rack according to the invention provides a safer laboratory environment for such workers.

While particular embodiments of the invention have been shown, it will be understood, of course, that the invention is not limited thereto since modifications can be made by those skilled in the art, particularly in light of the foregoing teachings. Reasonable variation and modification are possible within the foregoing disclosure of the invention without departing from the spirit of the invention.

The embodiments of the invention in which an exclusive property or privilege is claimed are defined as follows:

1. A laboratory drying rack system for supporting a variety of pieces of laboratory equipment comprising a panel having a front surface and a rear surface, at least one panel aperture extending through said panel for mounting at least one peg, a catch drain mounted to the rear surface of the panel below said at least one panel aperture, wherein said catch drain collects liquid draining down or collecting on the rear surface of the panel.

2. A laboratory drying rack system according to claim 1 wherein said catch drain comprises a flange extending upwardly and to the rear of the panel at an acute angle from said rear surface of the panel.

3. A laboratory drying rack system according to claim 1 further comprising at least one catch drain aperture formed in said catch drain for removing liquid from the catch drain.

4. A laboratory drying rack system according to claim 3 further comprising a drip trough mounted to a bottom edge of the panel below the catch drain to receive liquid from said at least one catch drain aperture.

5. A laboratory drying rack system according to claim 4 wherein said drip trough further comprises a drain tube to channel said liquid from the drip trough.

6. A laboratory drying rack system according to claim 4 wherein said drip trough extends downwardly at an obtuse angle from the front surface of said panel.

7. A laboratory drying rack system according to claim 1 wherein said at least one catch drain aperture further comprises at least one row of apertures extending through said catch drain immediately adjacent the junction between the catch drain and the rear surface of the panel.

8. A laboratory drying rack system according to claim 7 wherein said at least one catch drain aperture further comprises a second row of apertures extending through said catch drain a spaced distance from said at least one row of apertures.

9. A laboratory drying rack system according to claim 1 wherein said at least one panel aperture is noncircular in cross section and the cross section of said at least one peg is complementary such that said at least one peg is selectively mounted in said at least one aperture.

10. A laboratory drying rack system according to claim 1 further comprising a peg selectively mounted in said at least one aperture.

11. A laboratory drying rack system according to claim 10 wherein said peg is substantially normal to the front surface of the panel.

12. A laboratory drying rack system according to claim 10 wherein said peg extends upwardly at an acute angle from the front surface of the panel.

13. A drainage rack formed of sheet material adapted to be mounted on a wall for supporting a variety of pieces of laboratory equipment comprising a panel having a front surface and rear surface, said rear surface being mounted a spaced distance from the wall, at least one panel aperture formed in said panel for selectively mounting a peg in the at least one panel aperture and a catch drain mounted to a bottom edge of the panel, wherein said catch drain collects liquid collecting on and draining down the rear surface of the panel.

14. A drainage rack according to claim 13 wherein said catch drain comprises a flange extending upwardly at an acute angle with respect to the rear surface of the panel toward said wall.

15. A drainage rack according to claim 13 further comprising at least one catch drain aperture formed in said catch drain for removing liquid from the catch drain.

16. A drainage rack according to claim 15 further comprising a drip trough mounted to the bottom edge of the panel below the catch drain to receive liquid from said at least one catch drain aperture.

17. A drainage rack according to claim 16 wherein said drip trough further comprises a drain tube to channel said liquid from the drip trough.

18. A drainage rack according to claim 16 wherein said drip trough extends downwardly at an obtuse angle from the front surface of said panel.

19. A drainage rack according to claim 13 wherein said at least one catch drain aperture further comprises at least one row of apertures extending through said catch drain immediately adjacent the junction between the catch drain and the bottom edge of the panel.

20. A drainage rack according to claim 19 wherein said at least one catch drain aperture further comprises a second row of apertures extending through said catch drain a spaced distance from said at least one row of apertures.

21. A drainage rack according to claim 13 further comprising a peg selectively mounted in said at least one aperture.

22. A drainage rack according to claim 21 wherein said at least one panel aperture is noncircular in cross section and the cross section of said at least one peg is complementary such that said the peg is selectively mounted in one aperture.

23. A drainage rack according to claim 21 wherein said peg is substantially normal to the front surface of the panel.

24. A drainage rack according to claim 21 wherein said peg extends upwardly at an acute angle from the front surface of the panel.

* * * * *